April 12, 1932. P. A. WICKES 1,853,291
MULTIPLE FASTENER
Filed Oct. 7, 1929 2 Sheets-Sheet 1
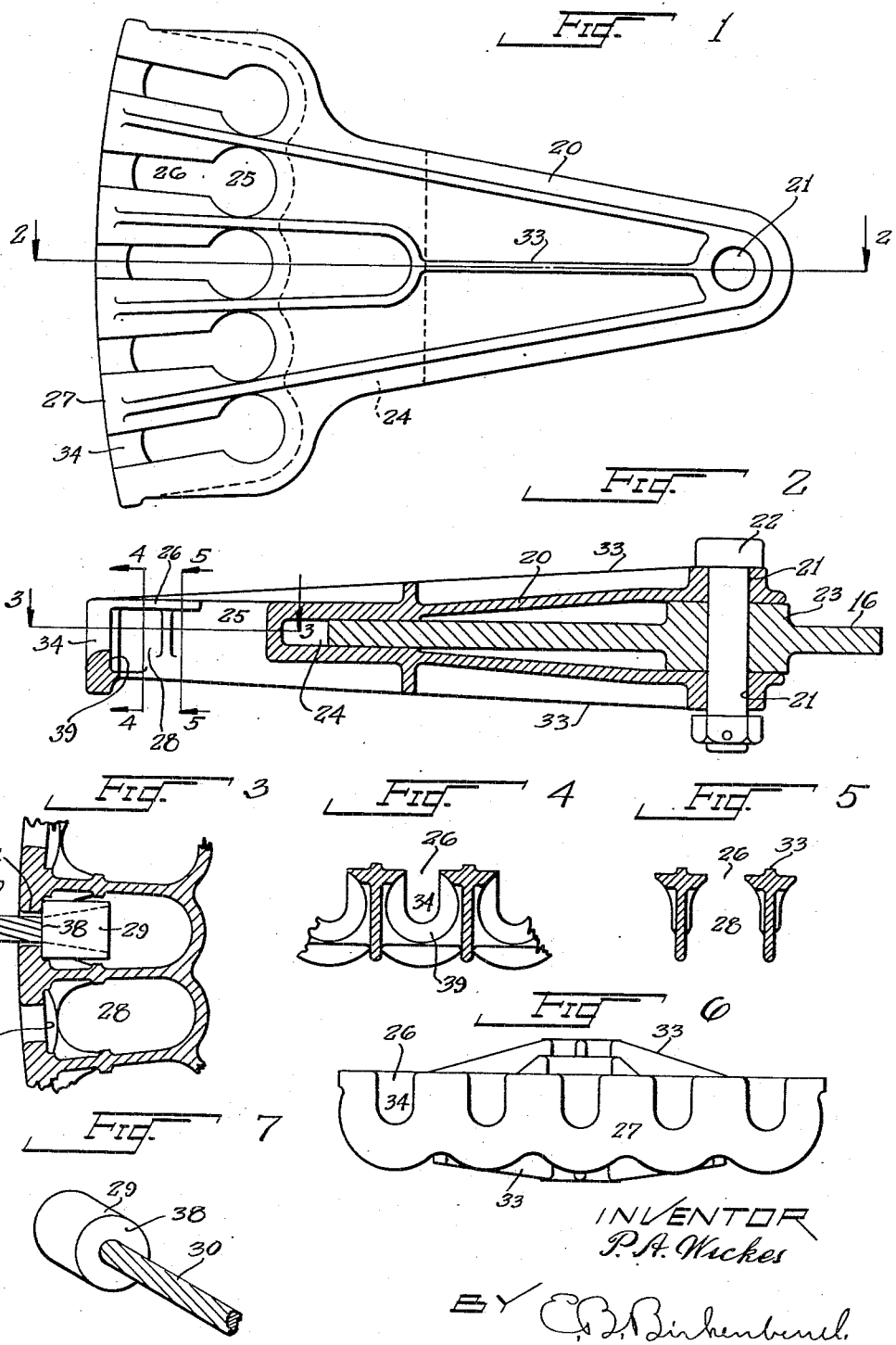

April 12, 1932.  P. A. WICKES  1,853,291
MULTIPLE FASTENER
Filed Oct. 7, 1929  2 Sheets-Sheet 2
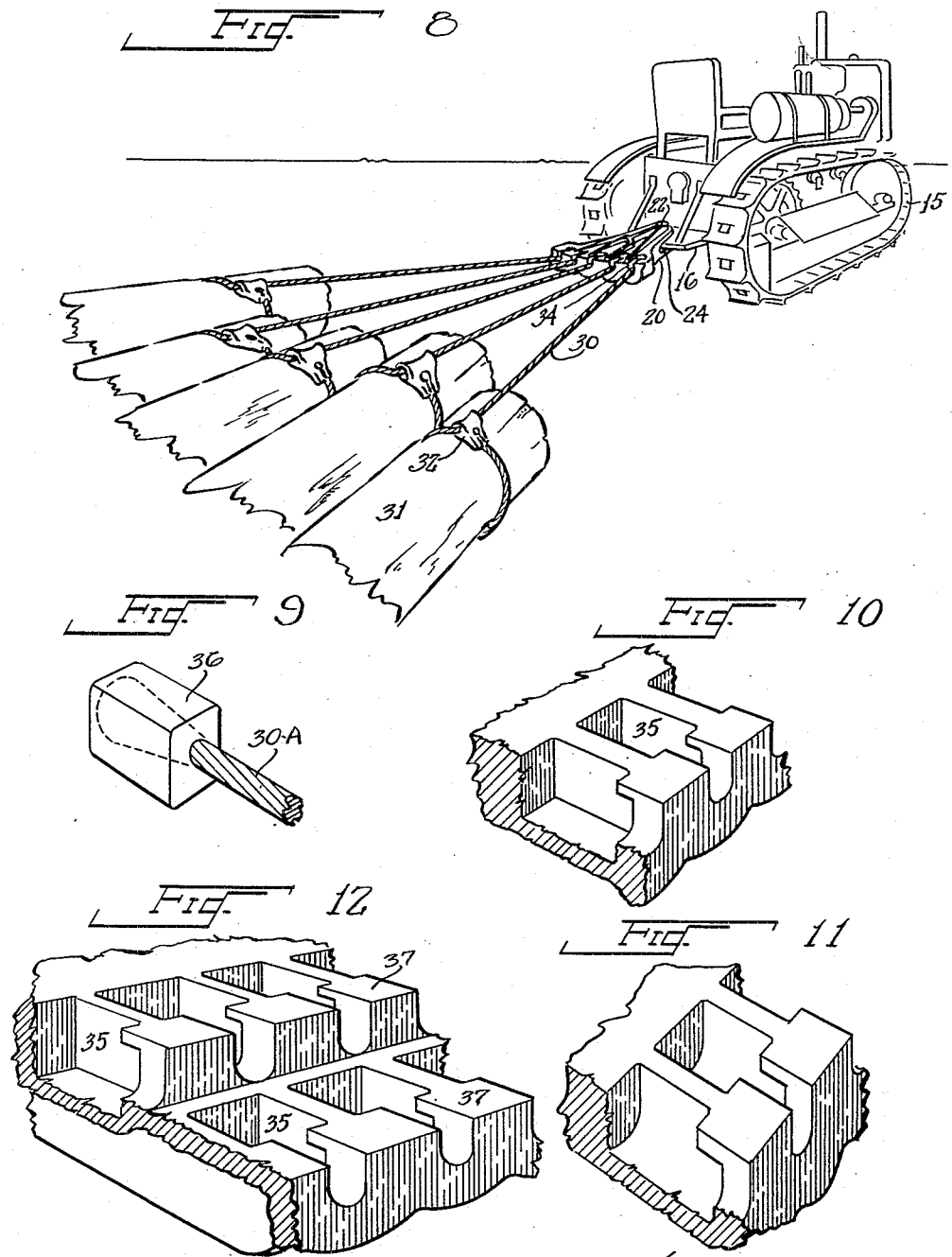

Patented Apr. 12, 1932

1,853,291

UNITED STATES PATENT OFFICE

POWERS A. WICKES, OF PORTLAND, OREGON, ASSIGNOR TO ELECTRIC STEEL FOUNDRY COMPANY, OF PORTLAND, OREGON

MULTIPLE FASTENER

Application filed October 7, 1929. Serial No. 397,924.

This invention relates generally to the logging industry, and particularly to a multiple fastener useful for attaching choker lines to a tractor.

The main object of this invention is to provide a multiple fastener in place of the usual draw bar of a tractor to which may be readily attached the ends of a plurality of choker lines.

The second object is to so construct the fastener that all of the lines may be inserted or removed from its top side.

The third object is to so construct the fastener as to minimize the bending action on the line, due to the fact that the fastener will seek a position approximating a resultant of all of the various stresses imposed thereon.

The fourth object is to so construct the fastener that it may adapt itself to use in connection with square or round thimbles on the ends of the chokers.

These, and other objects, will become more apparent from the specification following as illustrated in the accompanying drawings, in which:

Figure 1 is a plan view of the fastener.

Figure 2 is a vertical section along the line 2—2 in Figure 1.

Figure 3 is a horizontal section along the line 3—3 in Figure 2.

Figure 4 is a vertical section along the line 4—4 in Figure 2.

Figure 5 is a vertical section along the line 5—5 in Figure 2.

Figure 6 is an end view of the fastener from its line engaging end.

Figure 7 is a perspective view of the end of the choker showing a round ferrule.

Figure 8 is a perspective view of a typical logging operation wherein the device is employed.

Figure 9 is a perspective view of the end of a choker employing the square thimble.

Figure 10 illustrates a fastener employing a rectangular socket.

Figure 11 is a perspective view of a socket employed with a cylindrical ferrule.

Figure 12 shows a two tier fastener for increasing the number of outlets.

Similar numbers of reference refer to similar parts throughout the several views.

Referring in detail to the drawings, there is shown a tractor 15 preferably of the crawler type, at the back of which is mounted a platform 16 to which is ordinarily attached a draw bar for the purpose of trailing vehicles.

Referring more particularly to my invention it will be seen to consist of a sector 20 provided with an opening 21 for the draw bar pin 22, which also passes through the boss 23 of the platform or draw bar plate 16.

The sector 20 is provided with a horizontal slot 24 in which lies the member 16. In the top side of the sector 20 are formed a plurality of key-hole slots 25 whose smaller portions 26 open through the curved side 27 of the sector 20. Below each slot 26 is formed an enlarged recess 28 adapted to receive the ferrule 29 of a choker line 30 whose opposite end is made fast to a log 31 by means of a choker fastener 32, which may be of any desired type. The fastener is further strengthened by the use of radial ribs 33 on the top and bottom sides thereof, and the curved side 27 is a deep flange which itself is provided with slots 34 forming continuations of the slots 26, in which slots 34 rests that portion of the choker line nearest the ferrule 29.

In Figure 10 the recesses 35 are rectangular in form for use in conjunction with the rectangular ferrule 36 on the choker 30—A.

In Figure 12 the fastener is provided with terraces or steps 37 in each of which are formed the recesses 35, above described.

The operation of the device is as follows: When using this device to transport logs it is preferable to employ two or more sets of choker lines 30, some of which are being set on logs during the time others are being made fast to the tractor by inserting their ferrules 29 into the recesses 28 and then hauled away by the tractor 15. It will be seen that the insertion of the ferrule 29 into the fastener is from the top side only, and as soon as any tension is supplied to the line, be it only sufficient to drag the line along the ground, then the shoulder 38 of the ferrule 29 will come in contact with the shoulder 39 of the recess 28 preventing the end of the choker line from escaping from the fastener, above described.

While it is apparent that a number of single line fasteners could be attached to a tractor for the purpose of attaching many lines thereto, it is clear that this would involve the addition of a great deal of weight to the tractor, with the increasingly greater chance of having the lines foul during the operation.

By the use of the device just described it is not only possible to attach a number of choker lines to a tractor with a small amount of effort, but it can also be seen that the resulting pull from these lines will cause the fastening means to assume its best relation to the parts involved.

It will be course be apparent that any of the numerous forms of choker hooks and ferrule fittings may be used without departing from the spirit of this invention.

I claim:

1. A multiple fastener consisting of a sector having an opening therein to receive the draw bar pin of a tractor at one end thereof, the opposite end of said fastner forming a concentric curve with relation to said pin opening, said fastener having a plurality of key-hole openings in the top side thereof, the smaller side of each of which extending through said curved face, in combination with a draw bar plate to which said fastener can be hingedly attached for the purpose of holding same in a horizontal plane.

2. A multiple fastener consisting of a sector having a terraced end, a pivotal support at the axis of said sector, each of said terraces having a plurality of recesses formed therein adapted to receive the ferruled ends of choker hook lines when inserted from the top side thereof and to hold same against withdrawal upwardly while tension is placed upon said lines.

3. A multiple fastener for attaching lines to a tractor, having a sector-shaped body adapted to swing in a horizontal plane from the rear end of a tractor, the top side of said body having a plurality of ferrule receiving recesses formed therein, each of said recesses having a line receiving recess extending therefrom through the curved side of the sector radial with its point of hinging.

4. A multiple fastener for attaching a plurality of lines to a tractor consisting of a flat horizontal body member adapted to be attached to a tractor, the top side of said body having a plurality of key-hole slots formed therein, the narrow side of said slots pointing away from the tractor, and having an enlarged recess under each of said narrow slot portions for the reception of a cable ferrule.

5. A multiple fastener consisting of a somewhat sector shaped flat body having a vertical pivot at its pointed end adapted to permit said body to swing in a horizontal plane parallel to its flat body, said body having a plurality of approximately radial recesses formed therein, each of said recesses having the portion thereof farthest from the pivot center partially enclosed for the purpose of permitting the ferrule of a choker line to pass into this recess, and to permit the line of said choker to pass through the partly enclosed portion into the recess, the pointed end of said sector having a slot formed therethrough normal to the pivot axis, the central plane of said slot passing through the longitudinal axes of the respective recesses.

POWERS A. WICKES.